(12) United States Patent
Vizzini et al.

(10) Patent No.: US 11,936,023 B2
(45) Date of Patent: Mar. 19, 2024

(54) BATTERY MODULE

(71) Applicant: Volvo Car Corporation, Gothenburg (SE)

(72) Inventors: Simone Vizzini, Gothenburg (SE); Leonardo Claudio Amato, Sävedalen (SE); Luisa Zlatoidska, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/224,180

(22) Filed: Apr. 7, 2021

(65) Prior Publication Data

US 2021/0351454 A1  Nov. 11, 2021

(30) Foreign Application Priority Data

May 8, 2020 (EP) .................................. 20173616

(51) Int. Cl.
| | | |
|---|---|---|
| *H01M 10/6552* | (2014.01) | |
| *H01M 10/613* | (2014.01) | |
| *H01M 10/625* | (2014.01) | |
| *H01M 10/6554* | (2014.01) | |
| *H01M 10/6567* | (2014.01) | |
| *H01M 50/204* | (2021.01) | |
| *H01M 50/249* | (2021.01) | |

(52) U.S. Cl.
CPC ..... *H01M 10/6552* (2015.04); *H01M 10/613* (2015.04); *H01M 10/625* (2015.04); *H01M 10/6554* (2015.04); *H01M 10/6567* (2015.04); *H01M 50/204* (2021.01); *H01M 50/249* (2021.01); *H01M 2220/20* (2013.01)

(58) Field of Classification Search
None
See application file for complete search history.

(56) References Cited

U.S. PATENT DOCUMENTS

| | | |
|---|---|---|
| 8,231,996 B2 | 7/2012 | Howard |
| 9,246,200 B2 | 1/2016 | Kang et al. |
| 9,689,624 B2 | 6/2017 | Timmons et al. |
| 2009/0208829 A1 | 8/2009 | Howard et al. |

(Continued)

FOREIGN PATENT DOCUMENTS

| | | |
|---|---|---|
| CN | 106030231 A | 10/2016 |
| CN | 106876827 A | 6/2017 |

(Continued)

OTHER PUBLICATIONS

Oct. 21, 2020 European Search Report issued on International Application No. 20173616.

(Continued)

*Primary Examiner* — Lisa S Park
(74) *Attorney, Agent, or Firm* — Clements Bernard Walker; Christopher L. Bernard

(57) ABSTRACT

A battery module (1, 108, 408) including a plurality of heat pipes (30, 31, 130, 131, 430, 460, 531) configured to be thermally connected to a heat reservoir (76, 376), the heat pipes being individually sealed and integrated in an external surface (3, 408B) of the battery module. The heat pipes are configured to be arranged in physical contact with a heat conducting element (302A) for transferring heat to and/or from the battery module.

19 Claims, 5 Drawing Sheets

(56) References Cited

U.S. PATENT DOCUMENTS

| | | | |
|---|---|---|---|
| 2011/0287285 A1* | 11/2011 | Yoon | B60L 1/003 |
| | | | 429/9 |
| 2015/0167951 A1* | 6/2015 | Garelli | F21K 9/61 |
| | | | 362/249.02 |
| 2015/0207188 A1* | 7/2015 | Choi | H01M 10/6552 |
| | | | 429/82 |
| 2015/0244036 A1* | 8/2015 | Lane | H01M 10/625 |
| | | | 429/120 |
| 2017/0028869 A1* | 2/2017 | Boddakayala | B60L 58/26 |
| 2018/0034117 A1* | 2/2018 | Bang | H01M 10/663 |
| 2018/0269545 A1* | 9/2018 | Liu | H01M 50/20 |
| 2019/0393576 A1* | 12/2019 | Sunada | H01M 10/6554 |

FOREIGN PATENT DOCUMENTS

| | | | |
|---|---|---|---|
| CN | 206947466 | * | 1/2018 |
| CN | 105703036 B | | 6/2018 |
| CN | 110190356 A | | 8/2019 |
| JP | H0745310 | * | 2/1995 |
| JP | H0745310 A | | 2/1995 |
| JP | 2013073722 A | | 4/2013 |
| WO | WO20200248491 | * | 12/2020 |

OTHER PUBLICATIONS

Jun. 15, 2023 Office action and search report issued in the corresponding CN application No. 202110472495.8.

* cited by examiner

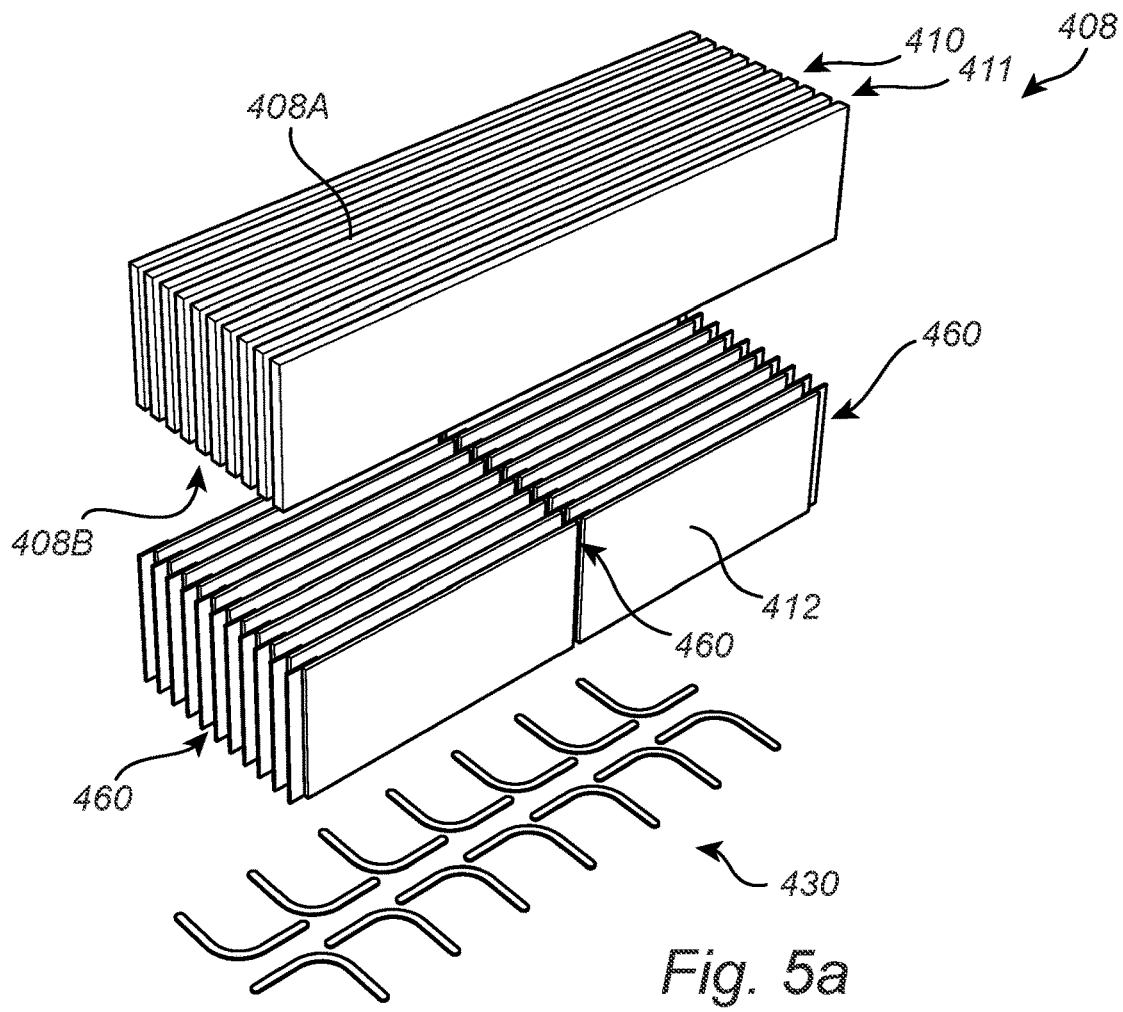
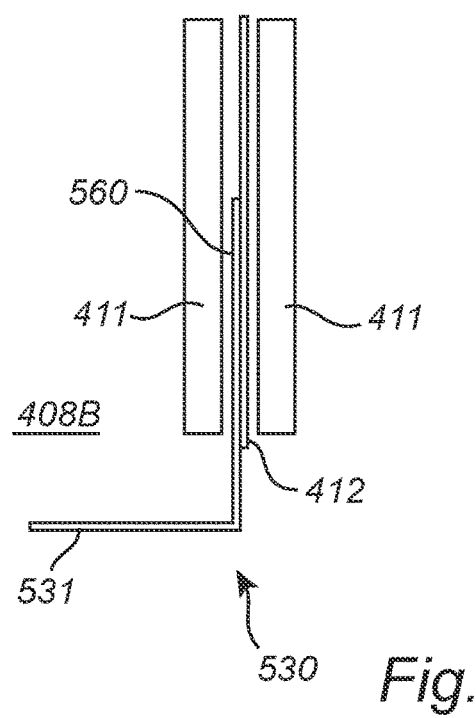
Fig. 5a
Fig. 5b

BATTERY MODULE

CROSS-REFERENCE TO RELATED APPLICATION

The present disclosure claims the benefit of priority of co-pending European Patent Application No. 20173616.2, filed on May 8, 2020, and entitled "A BATTERY MODULE," the contents of which are incorporated in full by reference herein.

TECHNICAL FIELD

The present disclosure relates to a battery module, to a battery pack including a plurality of battery modules, and to a vehicle, such as a hybrid or electrical vehicle, including such battery module or battery pack. In particular, the battery module includes a plurality of heat pipes individually sealed and integrated in an external surface of the battery module.

BACKGROUND

As electrical and hybrid vehicles are becoming increasingly popular, the development of energy efficient vehicle solutions is similarly accelerating. One important factor for determining the energy efficiency of a vehicle is the weight of the vehicle, and with the relatively large battery required for fully electric vehicles, there is a need for developing battery solutions with reduced weight.

In addition to the weight concern, thermal management of the battery is important. The battery system typically includes a thermal management arrangement for controlling the operating temperature of the battery, i.e. for heating or cooling the battery to achieve a preferable operating temperature. It is advantageous to have a thermal management arrangement which quickly adapts the temperature of the battery to the preferable operating temperature. Hereby, the efficiency, and/or life time, of the battery can be improved.

Accordingly, it is desirable to develop an efficient battery system so as to enable a more energy efficient vehicle.

SUMMARY

In general, the disclosed subject matter relates to a battery module having heat pipes integrated in the battery module. By integrating heat pipes in the battery module an effective heat transfer to and/or from the battery module to a heat reservoir (i.e. a heat sink or a cold sink) can be achieved. Moreover, the thermal management of the battery module can, in at least some aspects, be made less complex as the use of e.g. cooling plates and/or piping can be reduced or even omitted, resulting a reduced weight of the system.

According to at least a first aspect of the present disclosure, the battery module includes a plurality of heat pipes configured to be thermally connected to a heat reservoir, the heat pipes being individually sealed and integrated in an external surface of the battery module, the heat pipes being configured to be arranged in physical contact with a heat conducting element for transferring heat to and/or from the battery module. The heat pipes are arranged in the external surface of the battery module to effectively handle the thermal management of the battery module. Preferably, the plurality of heat pipes is at least partly integrated in a bottom surface of the battery module, for effectively heat transfer with the heat reservoir. Each heat pipe may advantageously be L-shaped.

An additional advantage of the described battery module is the reduced risk and impact of leaking fluids. A heat pipe is a particular heat transfer device that combines the principle of both thermal conductivity and phase transition to effectively transfer heat between two interfaces, and the amount of fluid in each heat pipe is relatively small. Since the high voltage battery and associated control circuitry is sensitive to water and other electrically conductive fluids, it is advantageous that the part of the thermal management arranged closest to the battery module constitutes the plurality of heat pipes, each heat pipe being individually sealed.

Moreover, the described battery module can reduce assembly complexity, as at least a part of the battery thermal management is integrated in the battery module as heat pipes. Hereby, fewer components are required for providing the battery thermal management, and cooling plates and/or piping for cooling fluid flows can be omitted or reduced, thereby reducing both cost and weight as well as simplifying the vehicle assembly.

According to at least one example embodiment, the plurality of heat pipes is configured to be fluidly separated from the heat reservoir. As mentioned above, the individually sealing of the heat pipes is advantageous due to the reduced risk and impact of leaking fluids.

According to at least one example embodiment, each heat pipe in the plurality of heat pipes includes an evaporation portion and a condensation portion, and a heat transfer fluid disposed inside the heat pipe and being configured to undergo a phase change such that the heat transfer fluid evaporates in the evaporation portion and condenses in the condensation portion. Movement of the heat transfer fluid within each heat pipe may include moving the heat-transfer fluid as a liquid from the condensation portion to the evaporation portion using capillary action, centrifugal force and/or gravity. Thus, the battery module is configured to induce such a movement, for example by providing capillary action means within each heat pipe.

In addition to transferring heat to and/or from the battery module, the heat pipes may according to at least one example embodiment be arranged and configured to internally re-distribute heat within the battery module. This further improves the thermal management of the battery module. According to at least one example embodiment, the respective evaporation portion is arranged in an outer portion of the battery module, and the respective condensation portion is arranged in an inner portion of the battery module in order to re-distribute heat between said outer and inner portion.

According to at least one example embodiment, the battery module includes a plurality of battery cells spaced apart from each other, and a plurality of fins arranged in the battery cell spacings. The battery module may further include a plurality of fin heat pipes arranged in said plurality of fins, the fin heat pipes being individually sealed. Thus, heat may be re-distributed within the battery module. For example, heat may be re-distributed, and removed, from an interior of the battery module to an exterior of the battery module. According to an alternative example embodiment, each heat pipe integrated in the external surface of the battery module include a fin portion configured to extend into a fin. Thus, each one of the plurality of heat pipes is partly integrated in the external surface of the battery module, and partly extends into the battery module.

According to at least a second aspect of the present disclosure, a battery pack including a plurality of battery modules is provided. At least one of the battery modules in the battery pack is a battery module according to the first aspect of the disclosure. The battery pack may further include the heat reservoir for transferring heat to and/or from the battery modules. Alternatively, the battery pack includes the heat conducting element, which is arranged and configured for thermal contact with a heat reservoir arranged externally of the battery pack.

According to at least one example embodiment, the battery pack includes a hollow plate for supporting the battery modules, the heat pipes of the battery modules being configured to be arranged in physical contact with an external surface of the hollow plate, and the heat reservoir being formed in the hollow plate. Thus, the above-mentioned heat conducting element may be formed by the external surface of the hollow plate. The battery pack may include a frame holding said battery modules, and optionally a battery pack lid, closing the battery modules inside of the battery pack.

According to at least a third aspect of the present disclosure, a vehicle including a battery module according to the first aspect of the present disclosure, or a battery pack according to the second aspect of the present disclosure is provided. The vehicle may e.g. be a hybrid vehicle or an electrical vehicle, such as e.g. a fully electric vehicle.

BRIEF DESCRIPTION OF DRAWINGS

FIG. 5A is a schematic illustration of a battery module according to an embodiment of the disclosure; and FIG. 5B is a detailed view of an alternative embodiment of the disclosure of FIG. 5A.

DETAILED DESCRIPTION

Figure 1:
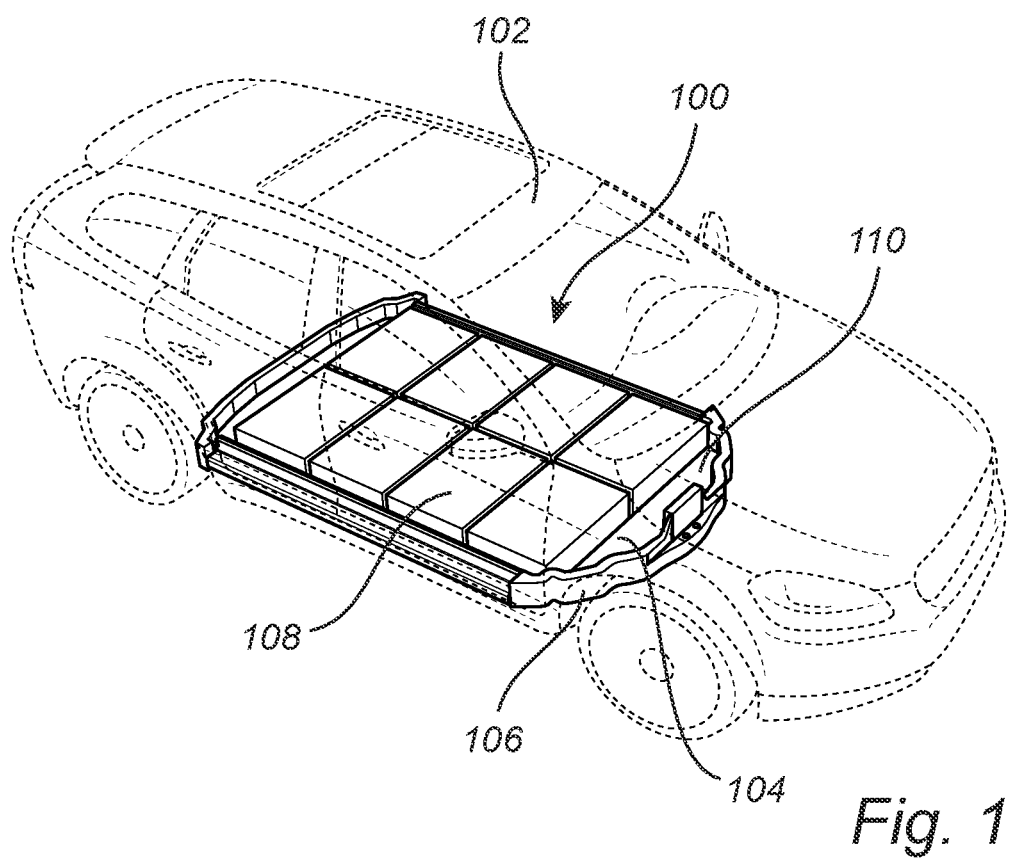
FIG. 1 is a schematic illustration of a vehicle including a battery pack of battery modules according to an embodiment of the disclosure.

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and fully convey the scope of the disclosure to the skilled person. Like reference characters refer to like elements throughout.

FIG. 1 is a schematic illustration of a battery pack 100 including a plurality of battery modules 108 arranged in a vehicle 102. FIG. 1 further illustrates a frame 106 and a bottom plate 104 holding and supporting the plurality of battery modules. The bottom plate 104 and frame 106 may be integrated with each other. The battery modules 108 are temperature controlled by a thermal management arrangement 110 located primarily underneath the battery packs 100, described further below.

Figure 2:
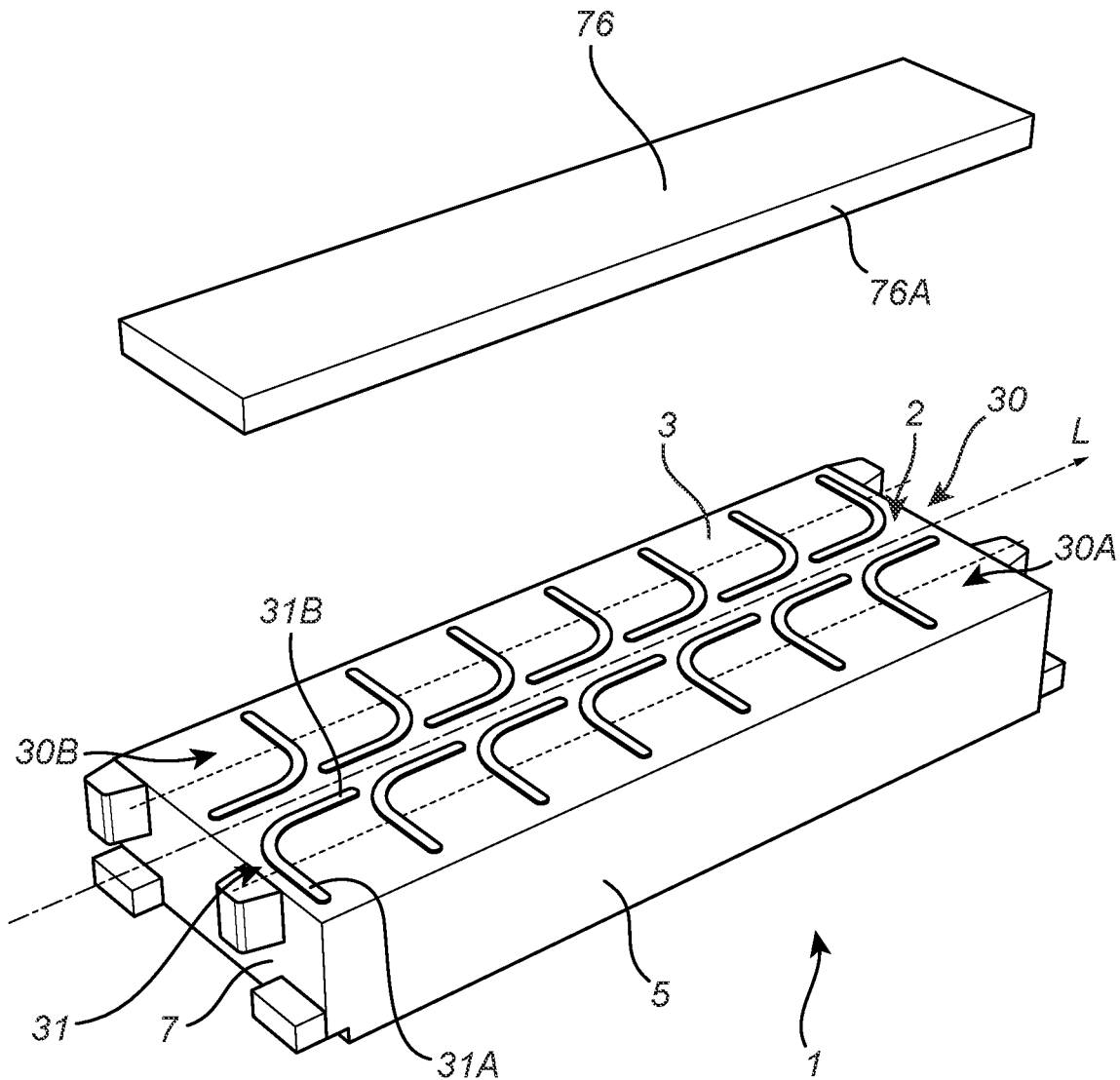
FIG. 2 is a schematic illustration of battery module including a plurality of integrated heat pipes according to an embodiment of the disclosure.

FIG. 2 schematically illustrates a battery module 1 including a plurality of heat pipes 30. The battery module 1 typically includes a plurality of battery cells (shown in FIG. 5A) held within the battery module 1. The battery cells may e.g. be pouch cells, cylindrical cells or prismatic cells. In the embodiment shown in FIG. 2, the battery module 1 is shaped as a rectangular cuboid, having six external surfaces (also referred to as face surfaces, facets or sides) of which only three external surfaces 3, 5, 7 are shown in FIG. 2. The external surface 3 facing upwards in the battery module 1 of FIG. 2 is a bottom facing surface 3 when the battery module 1 is installed as one of the battery modules 108 in the vehicle 102, as shown in FIG. 1. Thus, the plurality of heat pipes 3 is integrated into an external surface 3, being a bottom facing surface 3, of the battery module 1. The heat transfer pipes 30 may for example be soldered onto the battery module 1 or battery module housing. I should be noted that the plurality of heat pipes 3 may be integrated into more than one external surface of the battery module 1 to further improve the thermal management of the batteries.

Figure 3:
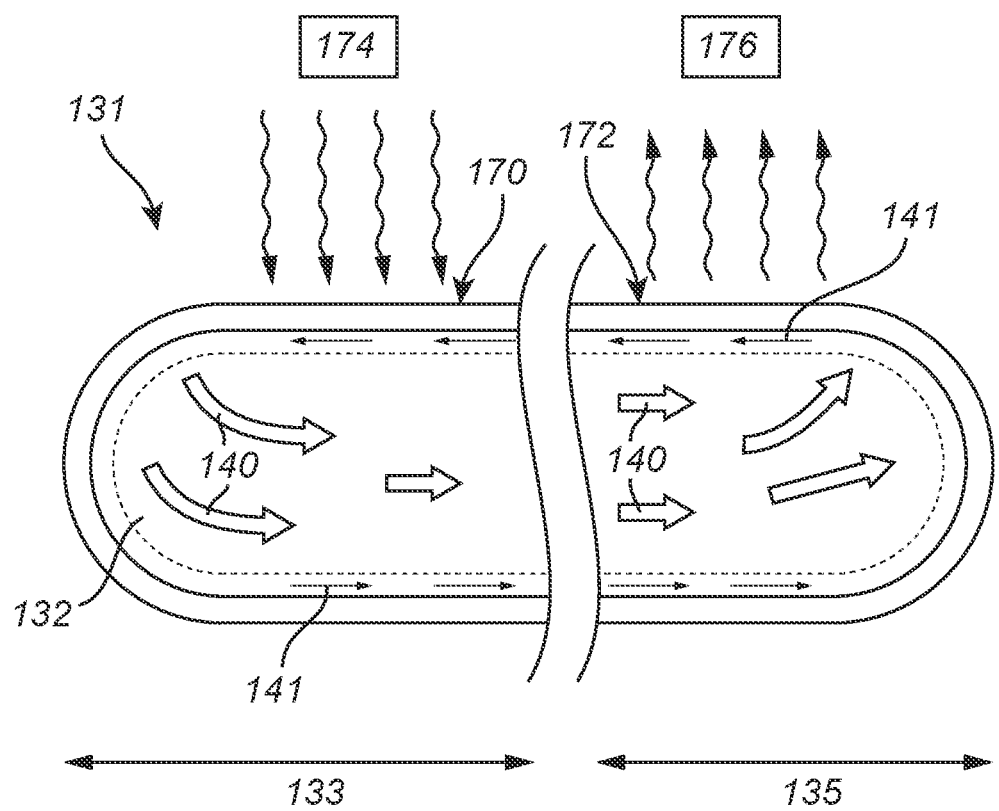
FIG. 3 is a schematic illustration of a typical heat pipe used in accordance with at least an embodiment of the disclosure.

Turning briefly to FIG. 3, illustrating an example heat pipe 131 which may be used in accordance with the disclosure, e.g. in the plurality of heat pipes 30 in FIG. 2. The heat pipe 131 is a heat transfer device that combines the principle of both thermal conductivity and phase transition to effectively transfer heat between two interfaces 170, 172. The heat pipe 131 is a sealed pipe having an internal cavity 132 holding a heat transfer fluid. The internal cavity 132 is surrounding by piping walls.

In a first portion 133, which in FIG. 3 is an evaporation portion 133, the heat pipe 131 is arranged to receive heat from a heat source 174, whereby the heat transfer fluid undergoes a phase change such that the heat transfer fluid evaporates in the evaporation portion 133. The heat pipe 131 further includes a second portion 135, which in FIG. 3 is a condensation portion 135, in which the heat pipe 131 is arranged to release heat to a heat sink 176. Thus, in the condensation portion 135 the heat transfer fluid undergoes a phase change such that the evaporated heat transfer fluid condensates to liquid. Thus, the heat transfer fluid disposed inside the heat pipe 131 is adapted, or configured, to undergo phase changes, such that the heat transfer fluid evaporates in the evaporation portion 133 and condenses in the condensation portion 135. Note that the heat pipe 131 is arranged such that, in case the heat source 174 and heat sink 176 switch places, the first portion 133 of the heat pipe is transferred into a condensation portion in which the heat transfer fluid condensates, and the second portion 135 is transferred into an evaporation portion in which the heat transfer fluid evaporates.

The evaporate heat transfer fluid thus flows from the evaporation portion 133 to the condensation portion 135, indicated by arrows 140, as the heat transfer fluid condensates into liquid at the condensation portion 135. The condensed heat transfer fluid (liquid) is then transported from the condensation portion 135 back to the evaporation portion 133, indicated by the arrows 141, where it again evaporates as heat is received from the heat source 174. The condensed heat transfer fluid is typically transported back to evaporation portion 133 near the internal walls of the heat pipe 131. The driving force for condensed heat transfer fluid transportation may e.g. be gravity. However, other means for generating a pressure difference between the evaporation portion 133 and condensation portion 135 are within the scope of the disclosure. For example, the heat-transfer fluid may be transported as a liquid from the condensation portion 135 to the evaporation portion 133 using capillary action, or centrifugal forces. If capillary action is used, the heat pipe 131 is typically equipped with a wick (dashed area including the arrows 141) arranged internally of the internal walls of the heat pipe 131. The pressure difference, or driving force, may alternatively be achieved by an electrical induced field.

Thus, the heat pipe 131 is sealed in both ends, and provide a closed loop heat transfer arrangement, in which no inlet or outlet for transporting fluid flow into or out from the heat pipe 131 are included. Thus, the heat pipe 131 is not fluidly connected to any inlet channel or outlet channel, or fluid flow distributing channel. Moreover, the heat pipe 131 is not fluidly connected to a heat reservoir. The amount of heat transfer fluid inside the heat pipe 131 may e.g. be a few milliliters, such as e.g. about 1 ml to 10 ml. Thus, even though a plurality of heat pipes 30 as shown in FIG. 2, such as e.g. 10-30 heat pipes, are integrated in the external surface 3 of the battery module 1, the total amount of heat transfer fluid is far less than in a conventional heat transfer piping system utilizing fluid flow for heat transfer management of the battery module. The heat transfer fluid may e.g. be water, or a water based glycol fluid.

Turning back to FIG. 2, each heat pipe 30 is individually sealed (i.e. sealed in both ends as described with reference to the heat pipe 131 of FIG. 3). For simplicity, one of the heat pipes 31 will now be described in more detail, but it should be understood that features and functions of the heat pipe 31 is applicable to any one of the plurality of heat pipes 30 in FIG. 2. In more detail, the heat pipe 31 is L-shaped having a first heat pipe portion 31A, and a second heat pipe portion 31B being angled in approximately 90 degrees compared to the first heat pipe portion 31A. The second heat pipe portion 31B is generally extending along the longitudinal axis L of the battery module 1 (i.e. the length direction of the battery module 1). The first and the second heat pipe portions 31A, 31B may be referred to as first and second heat pipe legs, respectively. Instead of L-shaped heat pipes as shown in FIG. 2, S-shaped heat pipes may advantageously be used (e.g. two L-shaped heat pipes which are mirrored, and combined).

Even though a heat pipe can be used for booth cooling and heating purposes, depending on the location of the heat source and heat sink as described with reference to FIG. 3, for the sake of simplicity, the battery module 1 of FIG. 2 is explained in relation to the task of cooling the battery module 1, and then specifically by using a heat sink 76 arranged adjacent to the external surface 3, centrally arranged along a longitudinal axis L. Thus, heat will be transferred away from the battery module 1 primary within the centrally arranged battery module portion 2 in the external surface 3. In the process of cooling the battery module 1, the battery module 1 acts as heat source, and the heat pipes 30 are configured to be thermally connected to the heat sink. Stated differently, the heat pipes 30 are arranged and configured to be in physical contact with a heat conducting element, here the heat sink 76, or any element thermally connected to the heat sink 76, such as e.g. a heat transfer layer 76A or conducting walls of a conduit including cooling fluid flow, for transferring heat from the battery module 1. Thus, heat can be transferred by physical contact with the heat reservoir 76, or a heat transfer layer 76A providing heat transfer to/from the heat reservoir 76.

More particularly, as the heat sink 76 is centrally arranged along the longitudinal axis L, heat transfer from the periphery of the battery module 1 is of particular interest, why the first heat pipe portion 31A is arranged to include the evaporation portion of the heat pipe 31. Correspondingly, the second heat pipe portion 31B is arranged to include the condensation portion of the heat pipe 31. Thus, heat is mainly removed from the battery module 1, by transporting heat away from the periphery of the battery module 1, via the heat pipe 31, to the heat sink 76, arranged centrally along the longitudinal axis L. Hereby, the heat pipe 31 also act to internally re-distribute heat from a periphery, to a more centrally arranged portion, of the battery module 1. Thus, the heat pipe 31 may additionally to transferring heat to and/or from the battery module 1, transfer heat within the battery module 1.

In FIG. 2, each heat pipe 30 is L-shaped and arranged and configured correspondingly to heat pipe 31 previously described. Moreover, the heat pipes 30 are arranged in two rows, a first row including a first sub-set 30A of the plurality of heat pipes 30, and a second row including a second sub-set 30B of the plurality of heat pipes 30. Each heat pipe in the second row is inverted, or rotated 180 degrees, relative the corresponding heat pipe in the first row. Thus, the plurality of heat pipes 30 are integrated into the external surface 3 of the battery module 1 such that the respective condensation portion is arranged centrally along the centrally arranged battery module portion 2, and the respective evaporation portion is arranged relatively closer to the periphery of the battery module 1. In other words, the respective evaporation portion is arranged in an outer portion of the battery module 1, and the respective condensation portion is arranged in an inner portion of the battery module 1 in order to re-distribute heat between the outer and inner portion. Thus, viewed from an angle perpendicular to the external surface 3 of the battery module 1, the condensation portion is typically arranged between the battery module 1 and the heat sink 76. Hereby, an external surface, such as a top surface, of the heat sink 76 (the heat sink e.g. including a cooling fluid), can be in direct contact with the external surface 3, such as the bottom surface 3, of the battery module 1 (or battery modules 108 of FIG. 1), minimizing the distance between the battery module 1 and the heat sink 76, and improving the thermal management properties of the battery module 1. Moreover, the central alignment of the portion 2 and heat source 76 with respect to the battery module 1 is advantageous in that it leads to a symmetrical arrangement where the side impact is the same for both sides of the battery module 1.

However, it should be noted that all heat pipes 30 integrated into the external surface 3 of the battery module 1 need not to be equally shaped and formed. Thus, according to at least one embodiment, the shape and form of at least two heat pipes differ from each other. Moreover, in FIG. 2, each heat pipe 30 is L-shaped at least in a geometrical plane parallel to the external surface 3 of the battery module 1. However, alternatively, one portion or leg of each L-shaped heat transfer pipe may be arranged in said geometrical plane, and another portion or leg of the L-shaped heat transfer pipe may be arranged perpendicular to said geometrical plane, i.e. being arranged into the battery module 1 (see FIG. 5B).

Figure 4:
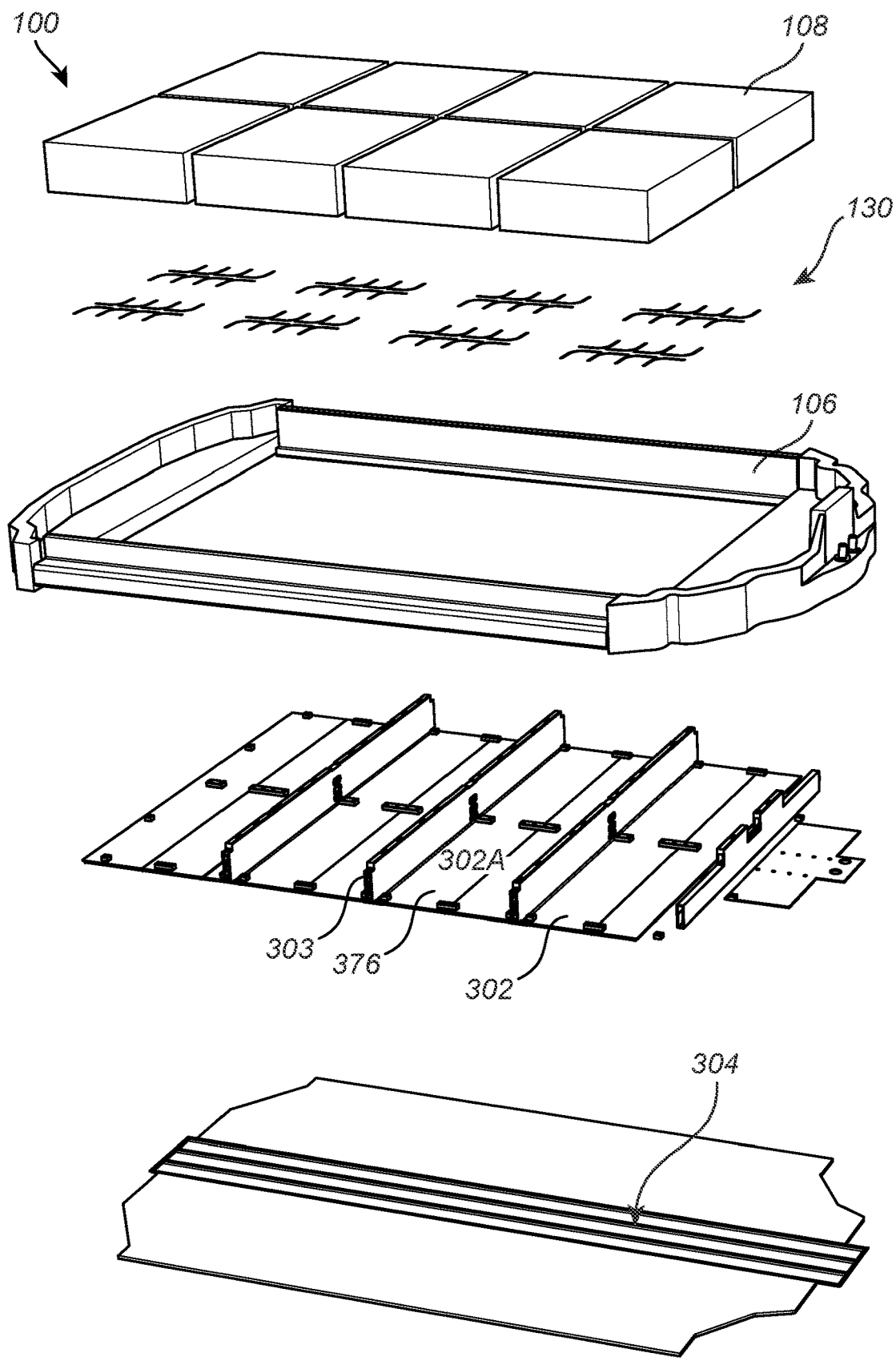
FIG. 4 is a schematic illustration of structural components of a battery pack according to an embodiment of the disclosure.

FIG. 4 is an exploded view schematically illustrating an example embodiment of a battery pack 100 as shown in FIG. 1. The battery pack 100 includes a plurality of battery modules 108, for example embodied by the battery module 1 of FIG. 2. From top to bottom, FIG. 4. illustrates the battery modules 108, a plurality of heat pipes 130 being individually sealed and integrated in the bottom surface of the battery modules, a frame 106 for holding the battery modules 108 in place, and a plurality of supporting plates 302 having a substantially flat upper surface configured to support, and be in contact with, the battery modules 108. The supporting plates 302 may be integrated with the frame 160 to form a battery tray for holding and supporting the battery modules 108. As shown in FIG. 4, latitudinally aligned elongate dividing elements 303 for keeping the battery modules 108 in place are provided. The dividing elements 303 also add to the stiffness and improves the side impact protection of the vehicle 102.

The supporting plates 302 may be hollow plates, and as shown in FIG. 4, at least one of the supporting plates 302 may hold, or include, the heat reservoir 376, here embodied as a heat sink 376. The heat sink 376 may e.g. be embodied as a flowing cooling fluid, or a cooling plate. Such cooling fluid or cooling plate may further be thermally, and potentially fluidly, connected to a secondary heat reservoir or heat sink 304, for example integrated into the bottom plate of the vehicle chassis, wherein a pump providing the sufficient driving force for circulating the cooling fluid is included in the system. Thus, the supporting plates 302 may further include a distribution channel for distributing cooling fluid. The distribution channel may be provided as an extruded aluminum sandwich structure including internal parallel distribution channels. Alternatively, the supporting plates 302 may form part of the vehicle chassis, such that the heat reservoir is integrated in the bottom plate of the vehicle chassis.

In FIG. 4, the heat pipes 130 of the battery modules 108 are arranged in physical contact with a heat conducting element, here being an external surface 302A of the supporting plates 302, which may be hollow, including the heat sink 376. The effect and features of such thermal contact have already been explained with reference to FIG. 2 and will now be repeated here again. As also shown in FIG. 4, the plurality of heat pipes 130 is configured to be fluidly separated from the heat sink 376, as the plurality of heat pipes 130 is individually sealed. That is, the heat pipes 130 are configured to be thermally and non-fluidly connected to the heat sink 376.

It should be noted that the heat reservoir, here heat sink 376, together with the heat pipes 130 may be referred to as a thermal management arrangement 110 of the battery modules 108. To further improve the thermal contact between the heat reservoir 376 and the battery modules 108, a thermal interface material (TIM) is preferably arranged on the flat upper surface of the supporting plates 302, which again may be hollow.

FIG. 5 is an exploded view schematically illustrating an example embodiment of a battery module 408 including a plurality of battery cells 410, for example embodied by the battery module 1 of FIG. 2. The battery cells 410 are spaced apart from each other, and a plurality of fins 412 are arranged in the battery cell spacings 411. Hereby, each fin 412 is arranged in the spacing 411 between two subsequent battery cells 410. The battery module 408 of FIG. 5 further includes a plurality of fin heat pipes 460 arranged in said plurality of fins 412. The plurality of fin heat pipes 460 is thus arranged in the battery cell spacings 411. As shown in the example embodiment of FIG. 5, the fin heat pipes 460 are distributed inside of the battery module in three rows, first and second rows of fin heat pipes 460 at a respective end portion of the battery module 408, and a third row of fin heat pipes 460 arranged in between the first and second rows. It should be noted that other configurations of the plurality of fin heat pipes 460 than that shown in FIG. 5 is within the scope of the disclosure. Moreover, the plurality of fin heat pipes 460 may be included in every second, or every third fin 412. That is, each one of the plurality of fins 412 need not to include a fin heat pipe 460.

The function of the fin heat pipes 460 is equivalent to that of the previously described heat pipes. Thus, fin heat pipes 460 can be re-distributed heat within the battery module 408 in an effective manner. Each one of the fin heat pipes 460 may be exemplified as the heat pipe 131 of FIG. 3. Thus, each one of the fin heat pipes 460 is individually sealed, and includes an evaporation portion and a condensation portion. For example, the evaporation portion for each one of the fin heat pipes 460 may be arranged at a first surface 408A, e.g. being a top surface 408A, of the battery module 408, and the condensation portion for each one of each fin heat pipes 460 may be arranged at a second surface 408B arranged opposite to the first surface 408A, the second surface 408B being e.g. a bottom surface 408B of the battery module 408. In such embodiment, the second surface 408B is typically arranged and configured for thermal contact with the heat reservoir (typically a heat sink).

According to at least one example embodiment, the plurality of fin heat pipes 460 constitutes a first set of heat pipes 460, and the battery module 408 further includes a second set of heat pipes 430 integrated in the second surface 408B of the heat module 408. The second set of heat pipes 430 are thus correspondingly arranged and configured as the plurality of heat pipes 30 in FIG. 2. Any embodiment mentioned with reference to the heat pipes 30 of FIG. 2 is thus applicable to the second set of heat pipes 430.

Alternatively, each heat pipe in the second set of heat pipes 430 is fluidly connected to a corresponding heat pipe in the first set of heat pipe 460. An example heat pipe 530 of such configuration is shown in FIG. 5b. Here, the heat pipe 530 is at least partly integrated in the second surface 408B of the battery module 408. Moreover, in such embodiments the heat pipe 530 is integrated in an external surface 408B of the battery module 408 and includes a fin portion 560 arranged to extend into a fin 412. Thus, a horizontal heat pipe portion 531 (corresponding to the first set of the heat pipes 430) is arranged and configured to re-distribute heat along the external surface 408B of the battery module 408, while a vertical heat pipe portion 560 (corresponding to the second set of heat pipes 460) is arranged and configured to re-distribute heat within the battery module 408.

Even though the disclosure has been described with reference to specific exemplifying embodiments thereof, many different alterations, modifications and the like will become apparent for those skilled in the art. Also, it should be noted that parts of the system may be omitted, interchanged or arranged in various ways, the heat pipes and associated thermal management arrangement of the battery module yet being able to perform the functionality of the present disclosure. For example, at least a portion of the thermal management arrangement 110 of FIG. 1 may form part of the bottom plate of the vehicle 102 which in turn forms part of the vehicle chassis. For such embodiments, the thermal management arrangement 110 is thereby part of the main structural load-bearing framework of the vehicle to which other components are attached. The vehicle chassis may also be referred to as the vehicle frame.

The heat pipes disclosed herein may be used for both the purpose of removing heat from the battery module (i.e. cooling) and supplying heat to the battery module (i.e. heating). In both cases, the arrangement and configuration of the heat pipes advantageously re-distribute heat within the battery module, and provide for an effective heat transfer to, or from, the battery module. Thus, the heat reservoir is either a heat sink (for cooling) or a heat source (for heating). Heating of the battery modules may e.g. be advantageous during start-up, or when operating in cool climates. Moreover, thermal interface material (TIM) may be applied between embodied heat pipes and the heat reservoir to avoid air gaps.

It should be noted that each heat pipe is relatively small, as compared to conventional piping for transferring a fluid flow. Moreover, as each heat pipe is individually sealed, or fluidly separated from the other heat pipes, the effect of a heat pipe damages in which the heat transfer fluid leaks out, is relatively limited.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. A battery module comprising:
a plurality of sides defining a housing of the battery module;
a plurality of battery cells held within the housing of the battery module;
a plurality of heat pipes configured to be thermally connected to a heat reservoir, the heat pipes being individually sealed and integrated in an external surface of one side of the housing of the battery module to internally re-distribute heat within the battery module, the heat pipes being soldered onto the external surface of the battery module and configured to be arranged in physical contact with a heat conducting element for transferring heat to and/or from the battery module, each heat pipe in the plurality of heat pipes comprising a condensation portion positioned along a centrally arranged portion of the external surface of the battery module and an evaporation portion positioned relatively closer to a periphery of the external surface of the battery module as compared to the condensation portion; and
the heat conducting element centrally arranged along a longitudinal axis of the battery module,
wherein the heat pipes soldered onto the external surface of the battery module are configured to transport heat away from the periphery of the external surface of the battery module to the centrally arranged portion of the external surface, via the heat pipe, to internally re-distribute heat within the battery module separate from heat being transferred from the battery module to the heat reservoir, the heat conducting element, an external heat sink, and/or an external cooling plate.

2. The battery module according to claim 1, the plurality of heat pipes being configured to be fluidly separated from the heat reservoir.

3. The battery module according to claim 1, wherein each heat pipe in the plurality of heat pipes includes a heat transfer fluid disposed inside the heat pipe and being configured to undergo a phase change such that the heat transfer fluid evaporates in the evaporation portion and condenses in the condensation portion.

4. The battery module according to claim 3, being configured to induce a movement of the heat transfer fluid within each heat pipe including induced movement of the heat-transfer fluid as a liquid from the condensation portion to the evaporation portion using capillary action, centrifugal force and/or gravity.

5. The battery module according to claim 1, each heat pipe being L-shaped.

6. The battery module according to claim 1, the plurality of heat pipes being at least partly integrated in a bottom surface of a bottom side of the battery module.

7. The battery module according to claim 1, wherein the battery cells of the plurality of battery cells are spaced apart from each other, and a plurality of fins is arranged in the battery cell spacings.

8. The battery module according to claim 7, further comprising a plurality of fin heat pipes arranged in said plurality of fins, the fin heat pipes being individually sealed.

9. The battery module according to claim 7, each heat pipe integrated in the external surface of the battery module comprising a fin portion configured to extend into a fin, wherein each fin portion is fluidly coupled to the condensation portion and the evaporation of the corresponding heat pipe.

10. A battery pack comprising a plurality of the battery modules according to claim 1, and an externally arranged heat reservoir for transferring heat to and/or from the battery modules.

11. The battery pack according to claim 10, further comprising a hollow plate for supporting the battery modules, the heat pipes of the battery modules being configured to be arranged in physical contact with an external surface of the hollow plate, and the externally arranged heat reservoir being formed in the hollow plate.

12. The battery pack according to claim 10, further comprising a frame holding said battery modules, and a battery pack lid.

13. A vehicle comprising the battery pack according to claim 10.

14. The battery module according to claim 1, wherein the plurality of sides of the housing the battery module
define a rectangular cuboid shape.

15. The battery module according to claim 14, wherein each heat pipe defines an L-shape within the one side of the housing including the external surface.

16. The battery module according to claim 14, wherein each of the heat pipes is soldered onto the external surface of a bottom side of the plurality of sides defining the rectangular cuboid shape.

17. The battery module according to claim 15, wherein the L-shape defined by each heat pipe is defined entirely in a geometrical plane parallel to the external surface of the bottom side of the plurality of sides defining the rectangular cuboid shape.

18. The battery module according to claim 9, wherein each heat pipe includes a horizontal pipe portion and the fin portion, wherein the fin portion of each heat pipe is configured to re-distribute heat within the battery module, and the horizontal pipe portion is configured to re-distribute heat along the external surface of the battery module.

19. The battery module according to claim 1, wherein the plurality of battery cells held within the housing of the battery module defines a constant spacing between any two adjacent battery cells.

* * * * *